United States Patent
Arakji (10) Patent No.: US 11,734,051 B1
(45) Date of Patent: Aug. 22, 2023

(54) RTOS/OS ARCHITECTURE FOR CONTEXT SWITCHING THAT SOLVES THE DIMINISHING BANDWIDTH PROBLEM AND THE RTOS RESPONSE TIME PROBLEM USING UNSORTED READY LISTS

(71) Applicant: Mazen Arakji, San Jose, CA (US)

(72) Inventor: Mazen Arakji, San Jose, CA (US)

(*) Notice: Subject to any disclaimer, the term of this patent is extended or adjusted under 35 U.S.C. 154(b) by 193 days.

(21) Appl. No.: 17/317,019

(22) Filed: May 11, 2021

Related U.S. Application Data (60) Provisional application No. 63/048,139, filed on Jul. 5, 2020.

(51) Int. Cl.
  *G06F 9/46* (2006.01)
  *G06F 9/52* (2006.01)
  *G06F 9/48* (2006.01)

(52) U.S. Cl.
  CPC ............ *G06F 9/461* (2013.01); *G06F 9/4812* (2013.01); *G06F 9/522* (2013.01); *G06F 2209/521* (2013.01)

(58) Field of Classification Search
  CPC ........ G06F 9/461; G06F 9/4812; G06F 9/522; G06F 2209/521
  See application file for complete search history.

(56) References Cited

U.S. PATENT DOCUMENTS

| | | | | |
|---|---|---|---|---|
| 5,889,988 | A * | 3/1999 | Held ................... | G06F 11/3664 714/E11.21 |
| 6,094,663 | A * | 7/2000 | Snow ................... | G06F 9/52 707/812 |
| 7,512,950 | B1 * | 3/2009 | Marejka ............... | G06F 9/522 718/102 |
| 9,280,389 | B1 * | 3/2016 | Lipsio, Jr. ........... | G06F 9/4881 |
| 10,282,326 | B1 * | 5/2019 | Yang ................... | G06F 13/26 |
| 11,507,524 | B2 * | 11/2022 | Arakji ................. | G06F 9/52 |

(Continued)

*Primary Examiner* — Emerson C Puente
*Assistant Examiner* — Zhi Chen
(74) *Attorney, Agent, or Firm* — Mazen Arakji (57) ABSTRACT

The present invention is a novel RTOS/OS architecture that changes the fundamental way that data is organized and context switching is performed. This novel approach consists of a context switching method in which interrupts are never disabled. This RTOS/OS architecture requires specialized hardware. Concretely, an advanced interrupt controller that supports nesting and tail chaining of prioritized interrupts is needed (e.g. the Nested Vectored Interrupt Controller (NVIC) found on many ARM processors) is required. The novel RTOS/OS architecture does not keep the list of tasks ready to run in sorted order, allowing for O(1) insertion time and utilizes a barrier variable to allow for safe O(n) insertion of tasks into the priority sorted list of blocked tasks without disabling interrupts. The advanced interrupt controller allows for any new interrupts to preempt the software exception handler thereby ensuring no data loss. This novel RTOS/OS architecture eliminates the diabolical deficiency existent in current architectures which creates a superficial dependency between the number of tasks in the system and the maximum bandwidth that can be sustained at some peripheral. That is, this architecture ensures that the maximum bandwidth never decreases as more tasks are added to the system.

2 Claims, 6 Drawing Sheets

(56) References Cited

U.S. PATENT DOCUMENTS

| | | | |
|---|---|---|---|
| 2008/0288940 A1* | 11/2008 | Adams | G06F 9/45558 |
| | | | 718/1 |
| 2010/0115236 A1* | 5/2010 | Bataineh | G06F 9/30101 |
| | | | 712/E9.003 |
| 2014/0075160 A1* | 3/2014 | Jones | G06F 9/522 |
| | | | 712/220 |
| 2015/0242334 A1* | 8/2015 | Higham | G06F 13/1668 |
| | | | 711/163 |
| 2020/0272515 A1* | 8/2020 | Brady | G06N 3/04 |

* cited by examiner

RTOS/OS ARCHITECTURE FOR CONTEXT SWITCHING THAT SOLVES THE DIMINISHING BANDWIDTH PROBLEM AND THE RTOS RESPONSE TIME PROBLEM USING UNSORTED READY LISTS

REFERENCE TO PROVISIONAL APPLICATION AS PER 35 U.S.C. § 119(e)

Title of Invention: Novel RTOS/OS Architecture For Context Switching Without Disabling Interrupts Using Unsorted Ready Lists and Task Defer Buffers
Application No. 63/048,139
Filing Date: Jul. 5, 2020

FIELD OF THE INVENTION

This invention is within the field of computer systems software, and in particular, real-time operating systems and operating systems. It addresses the ability of such systems to retrieve incoming data from external hardware peripherals, and the time it takes for such systems to begin processing this data. Specifically, the invention relates to how interrupts and context switching are implemented in such systems.

BACKGROUND

The ability of a computer to receive data from external hardware sources (peripherals) is a fundamental functionality. In the beginning, computers would simply only ever execute the very next instruction. Within a loop, the computer would check for new data from all peripherals. When a particular peripheral had new data available, then the computer would process it. However, it was discovered that such a system could lead to loss of data. This is true especially as the number of peripherals being monitored increased. The reason for the data loss is straightforward. While the computer is busy processing the data from one peripheral, another peripheral might receive multiple data, effectively overwriting the old value before it was processed.

The solution to this problem was interrupts. This is an actual hardware change to the processor itself. Concretely, new pins were added. These interrupt pins, were essentially new input to the processor. They were each connected to a peripheral. Upon new data being available at a particular peripheral, the interrupt pin connected to that peripheral would be activated. This would cause the computer to, instead of executing the very next instruction as usual, begin executing instructions from a predetermined location in memory. And so, clearly, these instructions (called an interrupt handler) would retrieve the data from the peripheral, store it in a particular buffer in memory set aside for that peripheral for future processing, and then return to the prior, regular, instruction execution. In this specification, the term "interrupt" refers exclusively to hardware exceptions of peripherals associated with I/O. With this change to the processor, namely, adding interrupts, the problem of data loss was solved. And so, in a computer system with interrupts, instead of having the computer check for new data from all peripherals as before, the computer could check its own memory, and specifically the memory buffer associated with each peripheral. When a memory buffer of a particular peripheral had new data or even multiple data, the computer could process it.

In addition to being able to retrieve data from peripherals without loss, many computer systems have requirements on how long it can be before the data that has been received and stored by the interrupt handler is finally processed. This is the response time. In the previously described computer system with interrupts, assume that a particular peripheral, peripheral A, is considered to be of the highest priority. That is, when new data is received and stored by the interrupt handler associated with peripheral A, it must be processed as soon as possible. A terrible response time occurs in this scenario: The computer checks the memory buffer associated peripheral A and finds that no new data is available. Then it checks the memory buffer associated with some other, lower priority peripheral, peripheral B, and discovers that it contains new data. In the same instant that the computer then begins to process this data (task B), new data from peripheral A arrives. The interrupt pin connected to peripheral A is activated and the interrupt handler for peripheral A executes, retrieving the data from peripheral A and storing in the memory buffer associated with peripheral A. The interrupt handler then returns to the prior, regular, instruction execution, namely, task B. Unfortunately, of all the peripherals, the time it takes to process the data from peripheral B is the longest. Finally, upon completing task B, the system can check the memory buffer associated with the high priority peripheral A and process it (task A). This system was forced to wait for the longest task to execute from beginning to end before being able to respond to the new data from the high priority peripheral.

The solution to this problem was the context switch. Context switches are a concept from the earliest operating systems, and were repurposed to solve the response time problem. A context switch is purely a software solution, and in its simplest form would be most easily described by reexamining the previous example: As before, in the same instant that the computer begins the processing of peripheral B's data (task B), new data from peripheral A arrives. And as before, the interrupt handler associated with peripheral A executes. However, after retrieving the data from peripheral A and storing it in the memory buffer associated with peripheral A, a context switch is executed. Instead of returning to the prior, regular processing, namely, task B, the context switch saves this for later, and first executes the processing of peripheral A's data (task A). Thus the response time for processing peripheral A's data is now constant and essentially equal to the context switch time. This solves the unbounded worst case response time for processing peripheral A's data.

The problem with this solution, however, is that during the context switch, interrupts are disabled. When interrupts are disabled, the original problem of data loss is reintroduced. As it exists today and since its inception, all context switches in all operating systems will disable interrupts. An example, which includes a better description of context switching, will illustrate the reason why interrupts must be disabled: Consider three tasks A, B, and C, associated with three peripherals A, B, and C. Assume that task A is the highest priority, while task B is medium priority, and task C is the lowest priority. In the scenario where task C is executing and new data is received in peripheral B, then a context switch will occur which will switch out task C for task B. This in fact involves saving the state of the processor as it was when it was executing task C and updating it with the required state so that when it continues, it will execute task B. The key here is that this requires multiple instructions. If, after saving the state of the processor as it was when it was executing task C, and while in the middle of updating the processor with information from task B (i.e. the processor state now contains new information from task B as well as old information from task C), new data arrives at peripheral A, then in the new context switch that occurs in order to switch out task B for task A, when the old state of the processor is saved, what is actually being saved is not a valid state. Disabling interrupts thus prevents such a scenario from occurring. With interrupts disabled, the saving of the old state and the updating of the new state can always be fully completed.

In fact, the context switch also involves updating the internal data structures of the RTOS/OS, and this similarly cannot be interrupted lest these structures also be rendered invalid. More importantly, however, these internal data structures (which are typically implemented using linked lists and used to keep track of tasks that are blocked or ready to run) have a key property: their size is bounded by the number of tasks in the system. Therefore, the amount of time that interrupts may be disabled increases as more tasks are added to the system. Consider, for example, that at the time data arrives at a peripheral associated with a (currently blocked) high priority task, the currently executing task is either a low priority task that had just disabled interrupts in order to block, or a medium priority task that had just disabled interrupts in order to unblock a low priority task. In the former case, the executing low priority task must be inserted into a priority-sorted list of tasks blocked on the same semaphore, and in the latter case the unblocked low priority task must be inserted into a priority-sorted list of tasks that are ready to run. In fact, even if neither circumstance applies, then the currently executing low/medium priority task must still be preempted and inserted (with interrupts disabled) into the priority-sorted list of tasks that are ready to run. All such linked list data structures have a sorted insertion running time of O(n). Therefore, the maximum time interval in which interrupts may be disabled increases linearly with the number of tasks (assuming 5 cycles/iteration of the loop used to insert into the sorted linked list, this comes to 5 cycles/task which is considerable since the length of the entire interrupt handler is 100-200 cycles).

That is, a linear dependency is created between the number of tasks in the system and the processor operating frequency required to maintain the maximal bandwidth that can be accepted at some peripheral. This problem shall be established as the diminishing bandwidth problem. Thus, an application designed to process input at some bandwidth, may fail after increasing the number of tasks in the system in order to perhaps enhance the functionality of the application. Modern processors address such concerns by providing hardware buffering at the peripheral itself. However, such solutions do not actually solve the diminishing bandwidth problem, and as more tasks are added to the system, the maximum bandwidth that can be accepted at some peripheral will ultimately continue to decrease. Furthermore, an RTOS/OS should not internally disable an interrupt that was enabled by the programmer.

The solution to this problem is an RTOS/OS architecture in which interrupts are never disabled. Such an architecture has been identified by the inventor in a previous patent (U.S. Pat. No. 11,507,524 B2): However, another architecture is possible, and is described herein.

BRIEF SUMMARY OF THE INVENTION

This invention comprises both software and hardware. The required hardware is an advanced interrupt controller that supports nesting and tail chaining of prioritized interrupts. Not all computers include such an interrupt controller. A prime example of such an interrupt controller is the Nested Vectored Interrupt Controller (NVIC) found on many ARM processors. Other interrupt controllers, or processors, that provide a similar functionality can be used with this novel RTOS/OS architecture. Thus far, operating system software has failed to properly exploit these advanced interrupt controllers.

For information about the NVIC, the reader is directed to: http://infocenter.arm.com/help/topic/com.arm.doc.dai0179b/ar01s01s01.html The software consists of a new system for context switching in which interrupts are never disabled. This system is composed of two parts. The first is in regards to interrupt handler logic, and the second is in regards to task context logic.

At its core, the invention is a redefinition how the lists of tasks that are ready to run and the lists of tasks that are blocked are organized and accessed. In previous RTOS/OS architectures, the lists of tasks that are blocked on some event and the list of tasks that are ready to run are maintained in sorted order according to task priority. These lists have an insertion running time of O(n) and a remove-highest-priority running time of O(1). In the present invention, the lists of tasks that are blocked on some event will be organized and handled in the same way, however, the list of tasks that are ready to run will not. This list will not be maintained in sorted order. Therefore, it will have a non-sorted insertion running time of O(1), but a remove-highest-priority running time of O(n). Interrupt handlers can thus both atomically remove the highest priority task from a list of tasks that are blocked and also atomically insert this task into the list of tasks ready to run in O(1). Subsequently, the interrupt handlers activate a low priority software exception, and in its handler all context switching logic is performed. Thus interrupts are never disabled by an interrupt handler.

For task contexts, two general embodiments are discussed, Task Context Embodiment A and Task Context Embodiment B. However, the choice of example embodiments in no way limits the techniques described herein. When a running task determines a context switch is required, it may either, instead of explicitly accessing RTOS/OS structures, activate a low priority software exception whose handler performs all context switching logic, or disable the software exception and proceed to access RTOS/OS structures directly. Thus interrupts are never disabled from a task.

The software exception must be set at a lower priority than the interrupts in the system. It can be interrupted at anytime by any interrupt. Since the interrupt controller supports nesting of interrupts, the higher priority interrupt will execute, and then processing will resume in the lower priority software exception handler. Thus no data can ever be lost.

DETAILED DESCRIPTION OF THE INVENTION

The invention redefines how the lists of tasks that are ready to run and the lists of tasks that are blocked are organized and accessed. In previous RTOS/OS architectures, the lists of tasks that are blocked on some semaphore and the list of tasks that are ready to run are maintained in sorted order according to task priority. These lists have an insertion running time of O(n) and a remove-highest-priority running time of O(1). In the present invention, the lists of tasks that are blocked on some event will be organized and handled in the same way, however, the list of tasks that are ready to run will not. This list will not be maintained in sorted order. Therefore, it will have a non-sorted insertion running time of O(1), but a remove-highest-priority running time of O(n).

Not maintaining the list of tasks ready to run in sorted order may seem inefficient to one with ordinary skill in the art, since if an interrupt associated with a high priority task unblocks said high priority task, then in the worst case, the high priority task's execution time will be increased by O(n), and concretely by n−1. However, first, such an increase in execution time is negligible since the execution time of tasks is on the order of 1000s of cycles. Second, even in previous architectures, this delay must be taken into account, since a lower priority task may disable interrupts in order to block, and thus traverse a similar list in the same amount of time before the high priority task can execute. Third, in the case that this high priority task unblocks all other tasks in descending priority order, then in previous architectures, this will increase the high priority task's execution time by $O(n^2)$, where as in the present invention the increase would be only O(n). In a hard real-time system, the worst case response time must be taken into consideration, for, in such systems, a missed deadline could result in the loss of human life. In the worst case, when all interrupts occur simultaneously, for previous architectures, this will also impose an $O(n^2)$ delay upon the response time of the high priority task. Again, in the present invention this delay is bounded by only O(n). The $O(n^2)$ delay of the previous architecture implies that the response time grows quadratically with the number of tasks (concretely, $c/f*n^2/2$, where n is the number of tasks, f is the processor operating frequency, and c is the number of cycles per iteration when traversing the ready list—conservatively 5). This is, in fact, another extensibility problem and a major deficiency. Therefore, the response time problem shall henceforth be further specified to either be the bare metal response time problem (associated with systems without an RTOS, as previously described herein), or the RTOS response time problem (associated with RTOSes of the previous architecture). Note that also, even for soft real-time systems, where the response time is not of paramount significance, if the high priority task unblocks one lowest priority task, then the conventional architecture loses its advantage. In all cases, however, any system that disables interrupts has the overwhelming disadvantage that the maximum bandwidth that it can accept at some peripheral is bounded by the maximum number of tasks that can exist in any list of tasks.

Next, how interrupt handlers operate in this novel architecture will be described. When data arrives at some peripheral, and the associated interrupt handler releases a semaphore, if the semaphore is 0, it will write a 1 to it and, in O(1), unblock the highest priority task blocked on that semaphore, which will try to acquire it. Since with the advanced interrupt controller, a currently executing interrupt handler may be preempted by a higher priority interrupt handler, and said higher priority interrupt handler may attempt to release the same semaphore (and access the same list), the task must be unblocked atomically. Disabling interrupts to do so would reintroduce the increased the possibility of data loss.

Assembly language instructions for these exact circumstances are standard in most modern architectures. For example ARM architectures contain the load and store exclusive instructions and x86 architectures include the cmpxchg instruction. These are called atomic instructions. They were initially conceived specifically for implementation of locks (semaphores) or wait-less linked list data structures to be used by tasks in a multitasking system. However, for the present invention, they will also be used by hardware interrupts.

Figure 1:
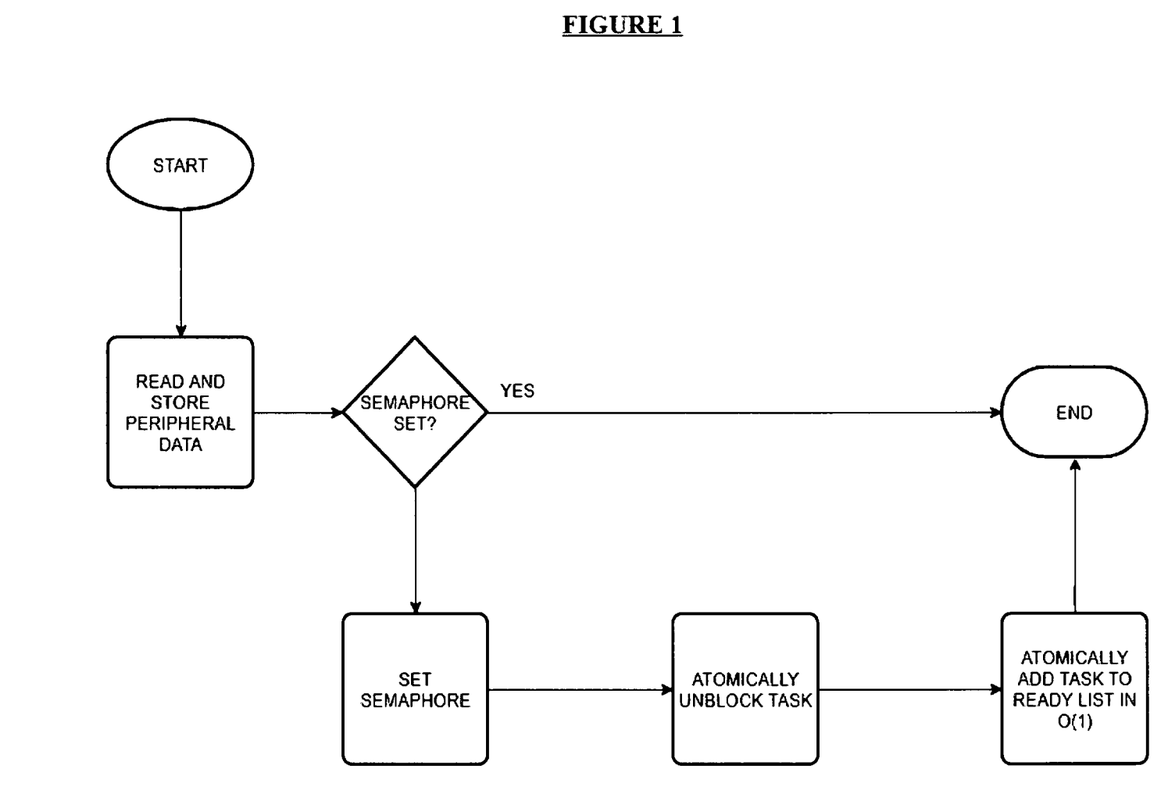
FIG. 1 Interrupt handler processes incoming data, unblocks tasks, and activates software exception.
Figure 2:
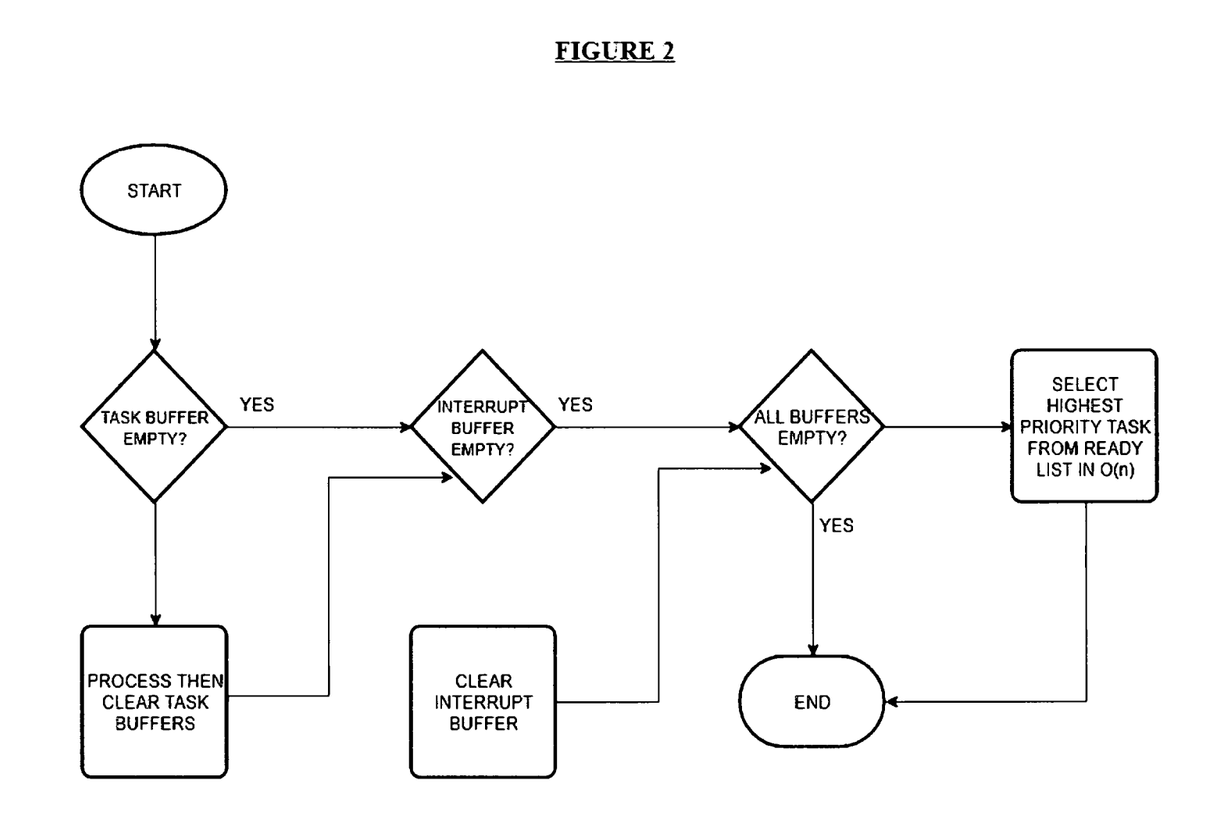
FIG. 2 Software exception handler processes task requests and performs context switching logic.

For information about the load/store exclusive, the reader is directed to: http://infocenter.arm.com/help/top For information about the load/store exclusive, the reader is directed to: http://infocenter.arm.com/help/topic/com.arm.doc.ddi0360f/BABCFJCG.html For information about the cmpxchg, the reader is directed to: https://www.felixcloutier.com/x86/CMPXCHG.html After the interrupt handler unblocks the task, it must be placed in the list of tasks ready to run. Since this list is not maintained in sorted order, this can be done in O(1). Further this list must also be accessed atomically, for the same reason given for the list of blocked tasks. In one embodiment, before the interrupt handler activates the lowest priority software exception, the interrupt handler writes 1 into a buffer of size 1 that is shared with the software exception handler in order to alert the software exception handler that it has unblocked a task. See FIG. 1. The software exception handler will null out that buffer before proceeding to, in O(n), select the highest priority task that can run. See FIG. 2. Note that if the selected task is at the tail of the unsorted ready list, it must be removed atomically since the tail can be concurrently accessed by an interrupt handler. In another embodiment, the interrupt handler may place the unblocked tasks in a predetermined buffer designated for that interrupt. This will relieve the interrupt handler from having to utilize atomic instructions a second time. Depending on the implementation, it may also relieve the software exception handler from having to atomically remove tasks from the end of the list. In the simplest embodiment, there is no communication between an interrupt handler and the software exception handler i.e. interrupt handlers unblock the tasks and activate the software exception. This embodiment is architecturally the most similar to conventional RTOS/OS architectures. Note that, this architecture allows for an embodiment which does disable interrupts but does not suffer the diminishing bandwidth problem. That is, if an interrupt handler disables interrupts in order to set a semaphore, unblock a task, and add it to the ready list, the amount of time that is required by this sequence of events is not dependent upon the number of tasks in the system. However, interrupts cannot be disabled when adding a task to the priority sorted list of tasks blocked on some semaphore without suffering the diminishing bandwidth problem.

Figure 3:
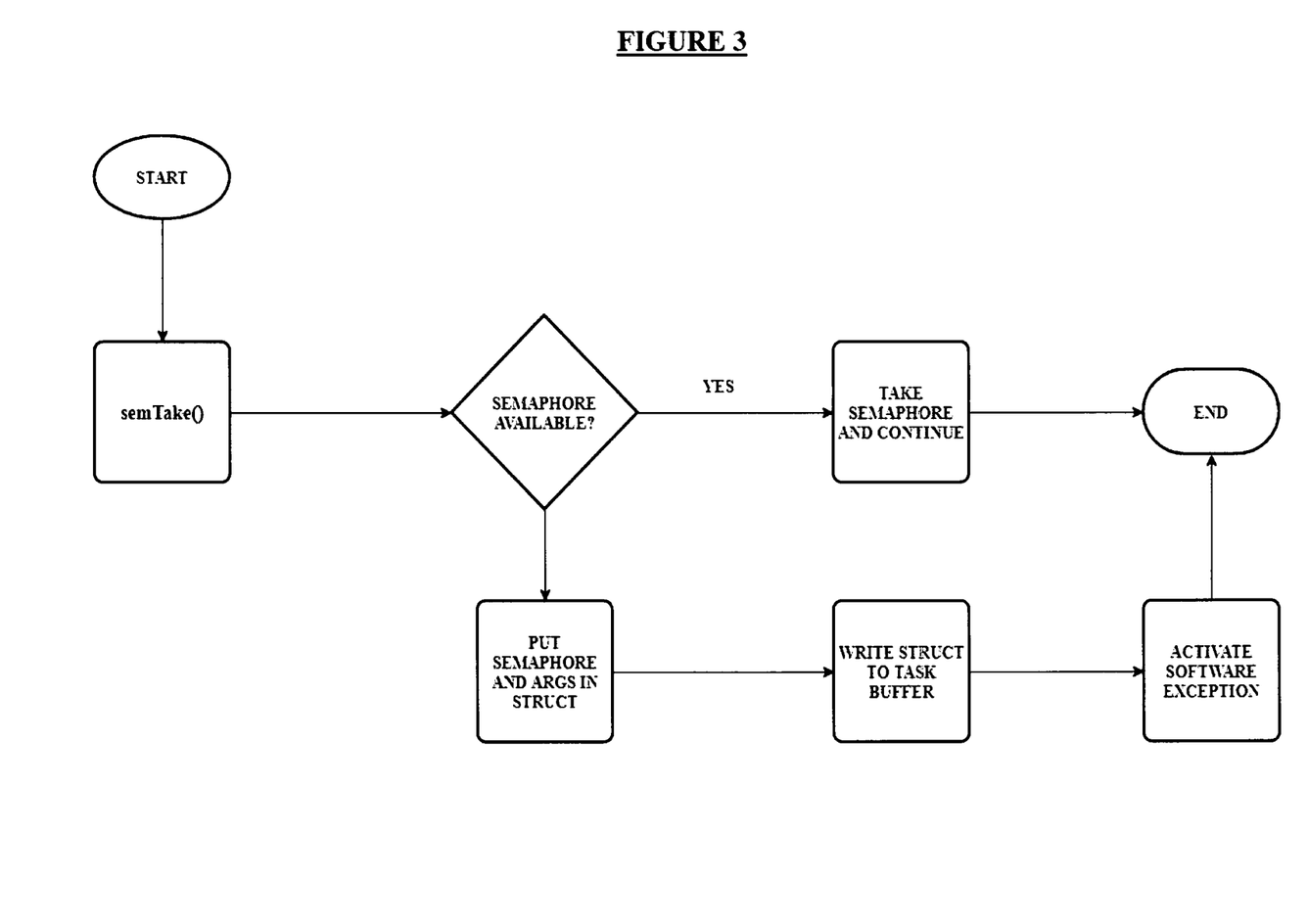
FIG. 3 Task acquires a semaphore.
Figure 4:
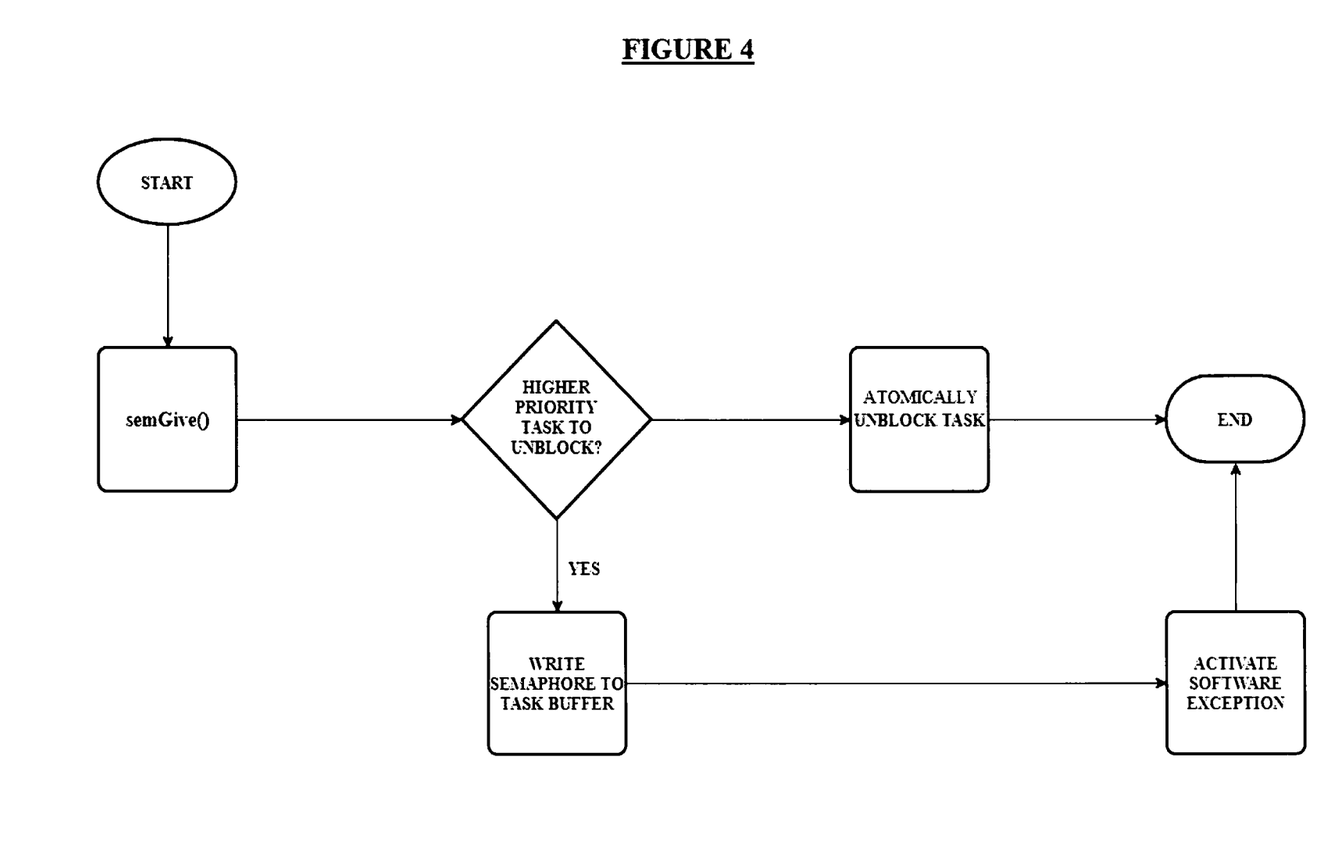
FIG. 4 Task releases a semaphore.

The second part of the invention is in regards to task context logic. Two general embodiments are presented. Task Context Embodiment A has been discussed by the inventor in a previous patent (U.S. Pat. No. 11,507,524 B2), and is re-described herein. It dictates that when a running task determines a context switch is required, either because a semaphore is released which unblocks a higher priority task, or because the running task itself must block on an unavailable semaphore, instead of explicitly modifying RTOS/OS structures, it writes one of two respective buffers, distinct from the one that may be utilized by the interrupt handlers. If the running task unblocks a higher priority task, then typically only the semaphore reference is required. If the running task must itself block, then the buffer is written with a reference to a single structure that combines the semaphore in question and any other parameters, such as the maximum time to block. See FIG. 3,4. The task then activates the low priority software exception, whose handler will conduct all context switching logic. The software exception handler will first examine the buffer written by the task, process the request, and null out the buffer. See FIG. 2.

Figure 5:
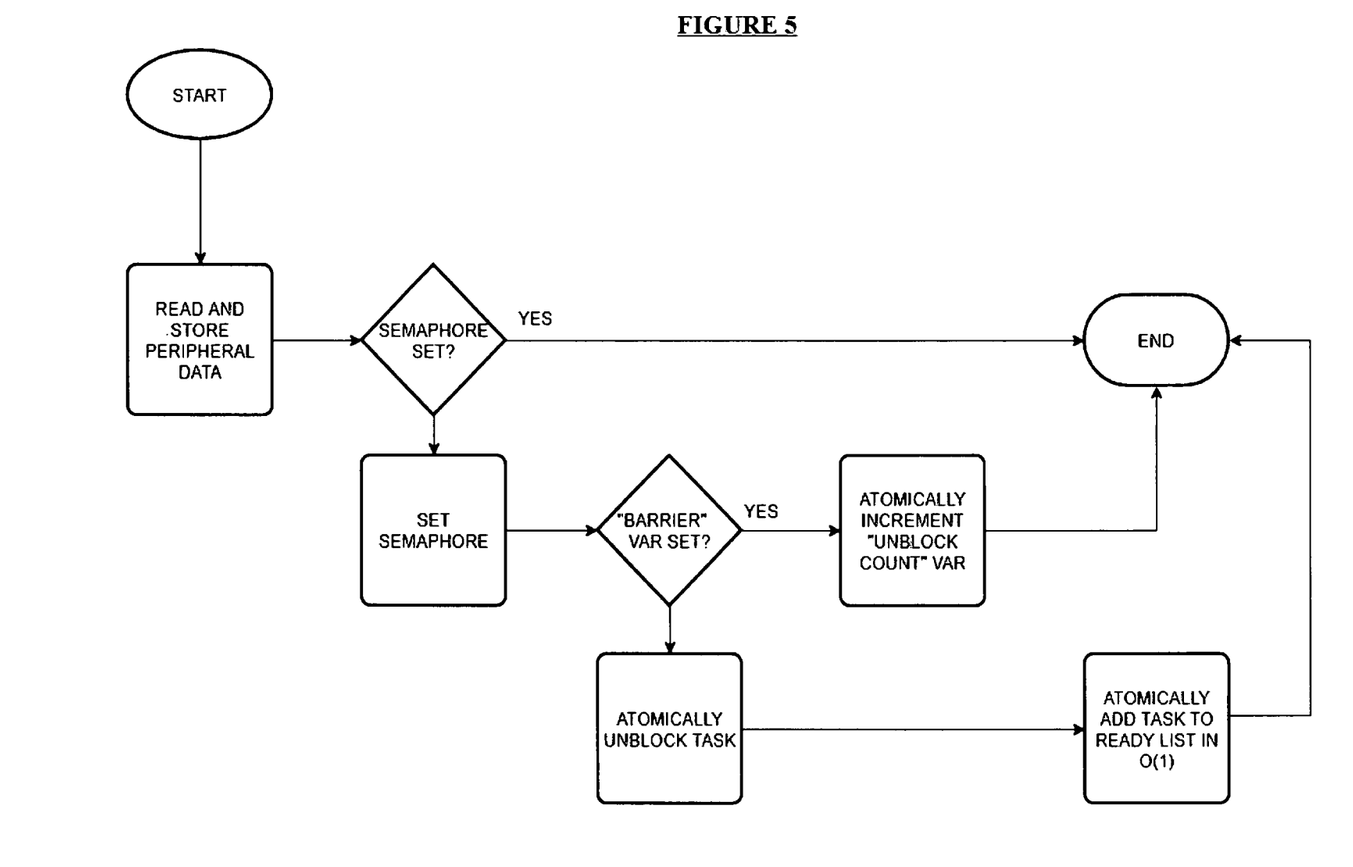
FIG. 5 Interrupt handler processes "barrier" and "unblock count" variables.
Figure 6:
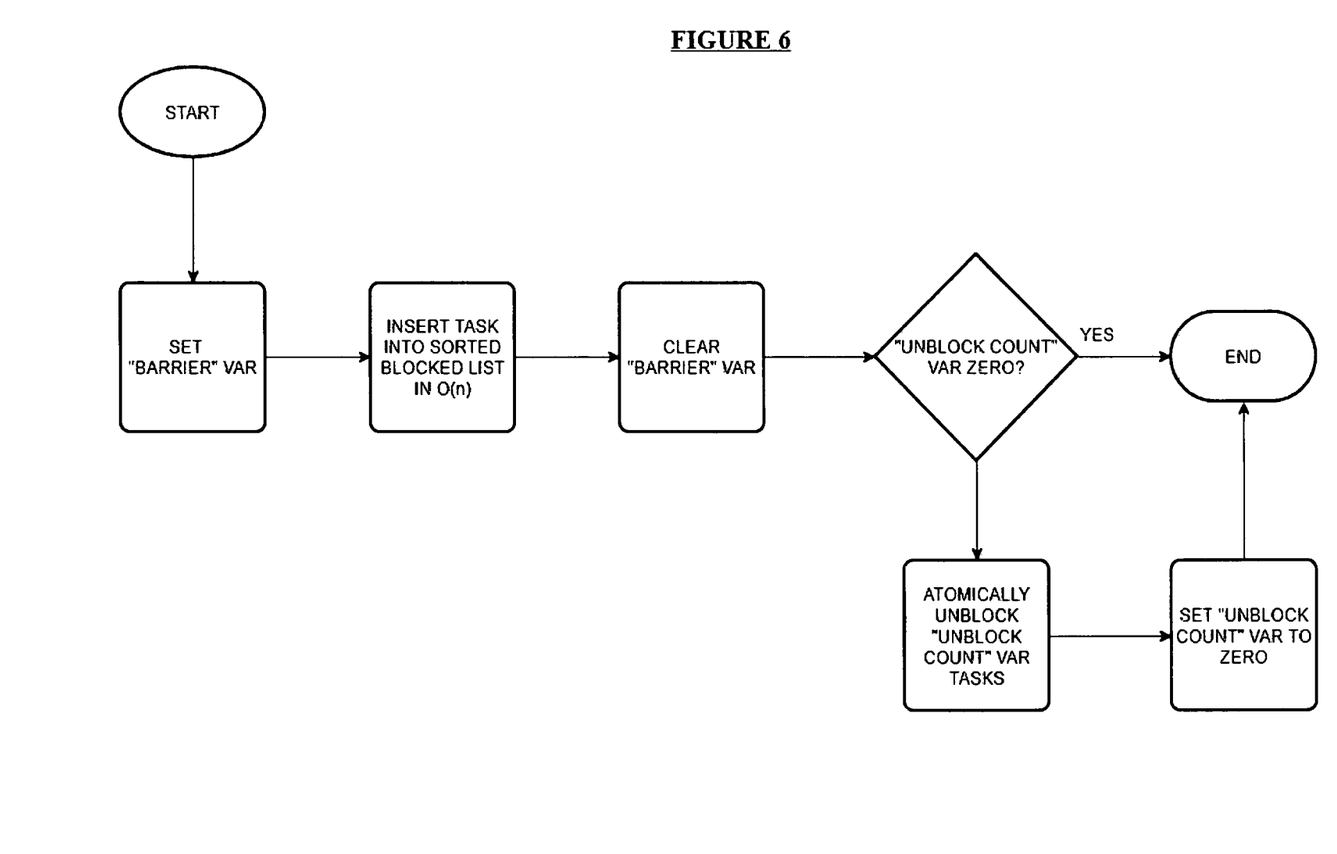
FIG. 6 Task added to a sorted list of tasks blocked on a semaphore.

It is important to discuss exactly how the software exception handler adds a task to a priority sorted list of tasks blocked on some semaphore. Recall that this list is accessed directly and concurrently by a multitude of interrupt handlers. In one embodiment, the semaphore itself contains a "barrier" variable that it set and cleared by the software exception handler and checked by the interrupt handlers. If the "barrier" variable is set, then interrupt handlers will not access the priority sorted list of blocked tasks. Rather they will atomically increment another variable (the "unblock count" variable) also contained in the semaphore which expresses the number of missed unblock operations that should have been performed on the list. This "unblock count" variable will be checked by the software exception handler after it clears the "barrier" variable, after it inserts a task into the blocked list. The software exception handler will then proceed to atomically unblock the required number of tasks that should have been unblocked according to the "unblock count" variable. See FIG. 5,6.

Task Context Embodiment B for how semaphores are handled from a task context is the most straightforward and the most similar to conventional architectures, albeit less efficient. Here, the running task can simply disable the software exception and proceed to atomically unblock a task and atomically add it to the end of the unsorted ready list, or to block itself as described in the proceeding paragraph. Note that if Task Context Embodiment B is utilized along with the previously described embodiment in which no shared buffers exist between interrupt handlers and the software exception handler, then the architecture of this novel system, only at the highest level, is very similar to conventional architectures. Of course, the underlying implementations are drastically different, however, if a conventional architecture is designed with the proper abstractions in place, then a change to this novel architecture can be more easily made and the diminishing bandwidth problem can be thwarted.

There are two great optimizations that can be implemented for this novel architecture. The first is for semaphores accessed from interrupt handlers. This optimization involves the use of an additional Boolean argument that describes whether or not this semaphore will be accessed by more than one interrupt handler. Note that it is an overwhelming convention for it to not be the case that the same semaphore is accessed by more than one interrupt handler. Taking advantage of this convention is thus prudent. This would allow an interrupt handler to set the semaphore and unblock the associated task without utilizing atomic instructions.

The second optimization is for running tasks that unblock lower priority tasks. Since the unblocked tasks cannot run until the running task completes, there is no need for the running task to immediately, and therefore necessarily atomically, add it to the list of tasks ready to run. Rather, it can be non-atomically added to an internal list maintained by the task. When the task completes, it can atomically add this internal list to the list of tasks ready to run. This method shall be established as lazy unblocking. Note that if ever the currently executing task is preempted by a higher priority one, the lower priority tasks that it had unblocked are irrelevant since it must always run first.

Note that this novel architecture, in which all context switching logic is

The invention claimed is:

1. A context switching method for a real time operating system supporting nesting of prioritized interrupts, comprising:
    detecting new data is available at a particular peripheral;
    interrupting a currently executing task in response to the detecting, wherein the currently executing task processes data from another peripheral;
    executing an interrupt handler that is corresponding to the particular peripheral, wherein the corresponding interrupt handler is one of a plurality of interrupt handlers and each of the plurality of interrupt handlers is set at a higher priority than a software exception handler;
    retrieving, by the corresponding interrupt handler, the new data at the particular peripheral;
    setting a first variable of a semaphore by the corresponding interrupt handler;
    determining, by the corresponding interrupt handler, that a barrier variable of the semaphore has been set, wherein the barrier variable was set by the software exception handler or the currently executing task;
    in response to determining the barrier variable has been set, preventing the plurality of interrupt handlers from removing tasks from a priority-sorted list of tasks, wherein the tasks are blocked by the semaphore;
    inserting, by one of the software exception handler or the currently executing task, the currently executing task into the priority-sorted list of tasks without disabling interrupts;
    clearing, by one of the software exception handler or the currently executing task, the barrier variable;
    removing, by one of the software exception handler or the currently executing task, one or more tasks from the priority-sorted list of tasks;
    inserting, by one of the corresponding interrupt handler, the software exception handler or the currently executing tasks, the one or more tasks to an unsorted list of tasks ready to run; and
    executing the one or more tasks from the unsorted-list of tasks ready to run.

2. The method of claim 1 further comprises:
    one of the plurality of interrupt handlers, the software exception handler or the currently executing task, atomically removes tasks from priority-sorted lists of blocked tasks in running time of O(1); and
    one of the plurality of interrupt handlers, the software exception handler or the currently executing task, atomically inserts tasks to the unsorted list of tasks ready to run in running time of O(1).

* * * * *